US010057016B2

(12) United States Patent
Lu et al.

(10) Patent No.: US 10,057,016 B2
(45) Date of Patent: Aug. 21, 2018

(54) METHOD AND APPARATUS FOR DATA TRANSMISSION (71) Applicant: Telefonaktiebolaget LM Ericsson (publ), Stockholm (SE)

(72) Inventors: Qianxi Lu, Beijing (CN); Rui Fan, Beijing (CN); Xinghua Song, Beijing (CN); Mattias Tan Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/917,271

(22) PCT Filed: Feb. 25, 2016

(86) PCT No.: PCT/CN2016/074515
§ 371 (c)(1),
(2) Date: Mar. 14, 2016

(87) PCT Pub. No.: WO2016/161854
PCT Pub. Date: Oct. 13, 2016

(65) Prior Publication Data
US 2017/0041102 A1 Feb. 9, 2017

(30) Foreign Application Priority Data

Apr. 9, 2015 (WO) ................ PCT/CN2015/076138

(51) Int. Cl.
*H04L 1/08* (2006.01)
*H04W 16/14* (2009.01)
*H04L 1/18* (2006.01)

(52) U.S. Cl.
CPC ............. *H04L 1/08* (2013.01); *H04L 1/1812* (2013.01); *H04L 1/1877* (2013.01); *H04W 16/14* (2013.01); *H04L 1/188* (2013.01)

(58) Field of Classification Search
CPC ...................................................... H04L 1/1809
(Continued)

(56) References Cited

U.S. PATENT DOCUMENTS 8,248,947 B2 * 8/2012 Li ........................ H04W 72/085
370/236
9,585,025 B2 * 2/2017 Abraham .............. H04W 16/14
(Continued)

FOREIGN PATENT DOCUMENTS

| CN | 102474727 A | 5/2012 |
| WO | 2011011557 A1 | 1/2011 |
| WO | 2014140877 A2 | 9/2014 |

OTHER PUBLICATIONS

International Search Report and Written Opinion for Application No. PCT/CN2016/074515, dated May 24, 2016, 13 pages.
(Continued)

*Primary Examiner* — Fritz Alphonse
(74) *Attorney, Agent, or Firm* — NDWE LLP (57) ABSTRACT

An efficient retransmission mechanism for use in consideration of uncertainty of resource availability on unlicensed carriers in a Licensed-Assisted Access scenario. Particularly, there is provided a method for data transmission at a first communications device operable in both a licensed spectrum and an unlicensed spectrum. The method comprises initially transmitting a data block on an unlicensed carrier of the unlicensed spectrum to a second communications device operable in both the licensed spectrum and the unlicensed spectrum and retransmitting the data block to the second communications device in response to receiving a negative acknowledgement from the second communications device. The method also comprises abandoning the retransmission under a predetermined condition associated with the unlicensed carrier. Correspondingly, there is also provided an
(Continued)

apparatus for data transmission at a communications device operable in both a licensed spectrum and an unlicensed spectrum.

17 Claims, 5 Drawing Sheets

(58) Field of Classification Search
USPC .................................... 714/748, 751, 746
See application file for complete search history.

(56) References Cited

U.S. PATENT DOCUMENTS

2010/0246478 A1* 9/2010 Liu ..................... H04L 1/1887
370/315
2016/0192396 A1* 6/2016 Ng .................... H04W 74/0808
370/329

OTHER PUBLICATIONS

ETSI TS 136 213 V11.7.0 (Jul. 2014), LTE; Evolved Universal Terrestrial Radio Access (E-UTRA); Physical layer procedures, 3GPP TS 36.213, Release 11, Jul. 2014, 184 pages.
ETSI TS 136 322 V12.2.0 (Apr. 2015), LTE; Evolved Universal Terrestrial Radio Access (E-UTRA); Radio Link Control (RLC) protocol specification, 3GPP TS 36.322, Release 12, Apr. 2015, 43 pages.
ETSI TS 136 331 V11.8.0 (Jul. 2014), LTE; Evolved Universal Terrestrial Radio Access (E-UTRA); Radio Resource Control (RRC); Protocol specification, 3GPP TS 36.331, Release 11, Jul. 2014, 359 pages.
RP-141664, Revision of RP-141646, "Study on Licensed-Assisted Access using LTE", 3GPP™ Work Item Description, 3GPP TSG RAN Meeting #65, Edinburgh, Scotland, Sep. 9-12, 2014, Source: Ericsson, Qualcomm, Huawei, Alcatel-Lucent, Agenda Item: 14.1. 1, 7 pages.
Examination Report from Bangladesh Application No. 67/2016/1394, dated May 4, 2017, 1 page.
International Preliminary Report on Patentability for Application No. PCT/CN2016/074515, dated Oct. 19, 2017, 8 pages.

* cited by examiner

METHOD AND APPARATUS FOR DATA TRANSMISSION

CROSS-REFERENCE TO RELATED APPLICATIONS

This application is a National stage of International Application No. PCT/CN2016/074515, filed Feb. 25, 2016, which claims priority to International Application No. PCT/CN2015/076138, filed Apr. 9, 2015, which are hereby incorporated by reference.

TECHNICAL FIELD

The non-limiting and exemplary embodiments of the present disclosure generally relate to wireless communications, and specifically to a method, an apparatus, and a computer program for data transmission between communications devices operable in both a licensed spectrum and an unlicensed spectrum.

BACKGROUND

This section introduces aspects that may facilitate better understanding of the present disclosure. Accordingly, the statements of this section are to be read in this light and are not to be understood as admissions about what is in the prior art or what is not in the prior art.

The fast uptake of the Third Generation Partnership Project (3GPP)-Long Term Evolution (LTE) in different regions of the world shows both that demand for wireless broadband data is increasing, and that LTE is a successful platform to meet that demand. The existing and new spectrum licensed for exclusive use by International Mobile Telecommunications (IMT) technologies will remain fundamental for providing seamless coverage, achieving the highest spectral efficiency, and ensuring the highest reliability of cellular networks through deliberate planning and deployment of high-quality network equipment and devices.

In order to meet the ever increasing data traffic demand of users, particularly in concentrated high traffic buildings or hot spots, more mobile broadband bandwidth will be needed. Given a large amount of spectrum available in unlicensed bands around the globe, the unlicensed spectrum is more and more considered by cellular operators as complementary means to augment their service provisioning. While the unlicensed spectrum cannot match the qualities of the licensed regime, solutions that allow efficient use of it as a complement to licensed deployment have a potential to bring a great value to 3GPP operators, and ultimately to the 3GPP industry as a whole. This type of solutions would enable operators and vendors to leverage the existing or planned investments in LTE/Evolved Package Core (EPC) hardware in radio and core networks.

Figure 1:
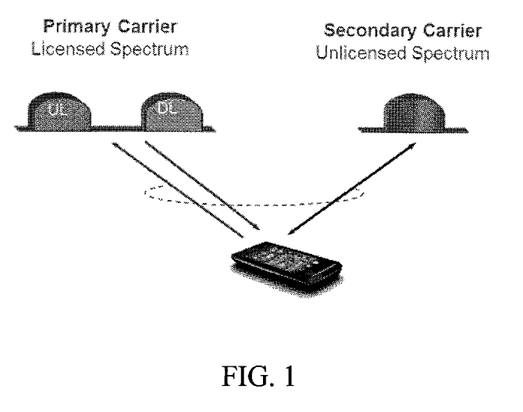
FIG. 1 illustrates an LTE network in which a UE is configured to aggregate additional secondary cells which are using frequency carriers in an unlicensed spectrum.

It has been agreed to study Licensed-Assisted Access (LAA) technologies in the 3GPP at RP-141664. This LAA framework builds on carrier aggregation solutions introduced in LTE Release-10 to access the additional bandwidth in the unlicensed spectrum. As illustrated in FIG. 1, an LTE network can configure a user equipment (UE) to aggregate additional secondary cells (S Cells) which are using frequency carriers in the unlicensed spectrum. The primary cell (PCell) maintains exchange of essential control messages and also offers an always-available robust spectrum, i.e. the licensed spectrum, for real-time and high-value traffic. Via the high-quality and robust licensed spectrum, the PCell may also provide mobility handling and management for the UE. The aggregated SCells in the unlicensed spectrum, when available, can be utilized as a bandwidth booster to serve, e.g. the best effort traffic. The LAA S Cell may operate in a downlink (DL)-only mode or operate with both uplink (UL) and DL traffic.

In 3GPP LTE systems, retransmissions of missing or erroneous data blocks are handled primarily by a Hybrid Automatic Repeat reQuest (HARQ) mechanism at the Medium Access Control (MAC) layer, complemented by the retransmission functionality of the Radio Link Control (RLC) protocol. With all resources in control, a base station at the network side may allocate resources for Acknowledgement/Negative Acknowledgement (ACK/NACK) feedbacks and retransmissions in a predefined way, so that the timing relationship for a new transmission and ACK/NACK, and for ACK/NACK and a retransmission is preconfigured by the 3GPP standard, e.g. in 3GPP TS 36. 213 V 11.7.0. For example, in a frequency division duplex (FDD) system, the timing is fixed to be a 4 ms offset, while in a time division duplex (TDD) system, the timing is fixed according to different UL/DL configurations. Furthermore, a maximum retransmission number is usually configured by the base station for the UE, e.g. by setting a parameter maxHARQ-Tx in the information element MAC-MainConfig as defined in 3GPP TS 36. 213 V 11.7.0, so that the UL HARQ behavior of the UE may be in control.

For a wireless local area network (WLAN) system operating in the unlicensed spectrum, the usage of HARQ is abandoned, mainly due to uncertainty of resource availability. Instead, the WLAN system only relies on an Automatic Repeat reQuest (ARQ) scheme defined at the logical link control (LLC) layer. In other words, the existing HARQ mechanism may not be applicable to unlicensed carriers of the unlicensed spectrum.

One main concern to apply the existing HARQ mechanism to unlicensed carriers directly is the uncertainty of resource availability on the unlicensed carriers. In a scenario where the collision probability on a specific unlicensed carrier is high, HARQ transmissions would cause a latency increase, which may be even longer than the t-Reordering timer defined for ARQ at the RLC layer. As defined in 3GPP TS 36.322 V12.2.0, the t-Reordering timer is used by the receiving side of an Acknowledged Mode (AM) RLC entity and receiving Unacknowledged Mode (UM) RLC entity in order to detect loss of RLC Packet Data Units (PDUs) at the lower layer, i.e., it is used to hold back the retransmission request until the receiving side is sure that the data unit is indeed lost. When the t-Reordering timer expires, a retransmission at the RLC layer will be started. In this case, it is useless to keep the old copy of the data unit in the HARQ buffer anymore.

Currently, there is not any differentiation in terms of the HARQ mechanism in the 3GPP standard with regard to different carriers.

SUMMARY

Various embodiments of the present disclosure mainly aim at providing an efficient retransmission mechanism in consideration of uncertainty of resource availability on unlicensed carriers in the LAA scenario. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method for data transmission at a first communications device operable in both a licensed spectrum and an unlicensed spectrum. The method comprises initially transmitting a data block on an unlicensed carrier of the unlicensed spectrum to a second communications device operable in both the licensed spectrum and the unlicensed spectrum and retransmitting the data block to the second communications device in response to receiving a negative acknowledgement from the second communications device. The method also comprises abandoning the retransmission under a predetermined condition associated with the unlicensed carrier. In some embodiments, the retransmission may be conducted according to a hybrid automatic repeat request (HARQ) protocol.

In an embodiment, the retransmission may be abandoned earlier than a maximum number of retransmissions on a licensed carrier configured for the first communications device in the licensed spectrum.

At least by virtue of the conditional and/or earlier abandon of retransmission, the unexpected or unnecessary transmission latency caused by uncertainty of resource availability on unlicensed carriers may be reduced or avoided.

In a further embodiment, the predetermined condition associated with the unlicensed carrier may comprise a number of retransmissions reaching a predetermined maximum number of retransmissions on the unlicensed carrier, expiry of a predetermined timer, or reception of a message instructing the abandon of the retransmission from the second communications device.

In another embodiment, when the predetermined condition comprises the expiry of the predetermined timer, the method may further comprise starting the predetermined timer when the data block is initially transmitted to the second communications device.

In yet another embodiment, the first communications device may be a terminal device, while the second communications device may be a base station. In such an embodiment, the predetermined condition, such as the predetermined maximum number of retransmissions on the unlicensed carrier or the predetermined timer may be configured by the second communications device.

In a second aspect of the disclosure, there is provided an apparatus for data transmission at a first communications device operable in both a licensed spectrum and an unlicensed spectrum. The apparatus comprises an initial transmission unit configured to initially transmit a data block on an unlicensed carrier of the unlicensed spectrum to a second communications device operable in both the licensed spectrum and the unlicensed spectrum and a retransmission unit configured to retransmit the data block to the second communications device in response to receiving a negative acknowledgement from the second communications device. The apparatus also comprises an abandoning unit configured to abandon the retransmission under a predetermined condition associated with the unlicensed carrier. The apparatus may be embodied at a base station or at a terminal device.

In an embodiment, the abandoning unit may be further configured to abandon the retransmission earlier than a maximum number of retransmissions on a licensed carrier configured for the first communications device in the licensed spectrum.

In another embodiment, the predetermined condition associated with the unlicensed carrier may comprise a number of retransmissions reaching a predetermined maximum number of retransmissions on the unlicensed carrier, expiry of a predetermined timer, or reception of a message instructing the abandon of the retransmission from the second communications device.

In a further embodiment, if the predetermined condition comprises the expiry of the predetermined timer, the apparatus may further comprise a timer starting unit configured to start the predetermined timer when the data block is initially transmitted to the second communications device.

In a third aspect of the present disclosure, there is provided an apparatus for data transmission at a first communications device operable in both a licensed spectrum and an unlicensed spectrum. The apparatus comprises a processor and a memory. The memory contains instructions executable by the processor, whereby the apparatus is operative to perform the method according to the first aspect of the present disclosure.

In a fourth aspect of the present disclosure, there is provided an apparatus for data transmission at a first communications device operable in both a licensed spectrum and an unlicensed spectrum. The apparatus comprises processing means adapted to perform the method according to the first aspect of the present disclosure.

In a fifth aspect of the present disclosure, there is provided a computer program comprising instructions. The instructions, when executed on at least one processor, cause the at least one processor to carry out the method according to the first aspect of the present disclosure.

It should be appreciated that, corresponding embodiments of the first aspect are also applicable to the second, third, fourth and fifth aspect.

With particular embodiments of the techniques described in this specification, by differentiating retransmission conditions on different carriers, e.g. licensed and unlicensed carriers, the retransmission number and/or time for unlicensed carriers will not be limited by the maximum retransmission number set for the licensed carriers. Accordingly, the problems such as latency increase due to the direct application of the existing HARQ mechanism to the LAA scenario may be avoided. By taking into account of the uncertainty of resource availability on unlicensed carriers and adopting appropriate and timely retransmission abandon conditions for the unlicensed carriers, an efficient retransmission mechanism suitable for the LAA scenario may be achieved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which.

Like reference numbers and designations in the various figures indicate like elements.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" (BS), used herein may also be referred to as e.g. eNB, eNodeB, NodeB or base transceiver station (BTS) etc. depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. The term "communications device" used herein may refer to any device operable to conduct communications in a wireless communications network, which may comprise a base station and a terminal device.

For illustrative purposes, the concept and principle of some embodiments of the present disclosure will be described in the context of HARQ mechanism. Those skilled in the art will appreciate, however, that the concept and principle of the several embodiments of the present disclosure may be more generally applicable to other scenarios that may involve data retransmissions.

Figure 2:
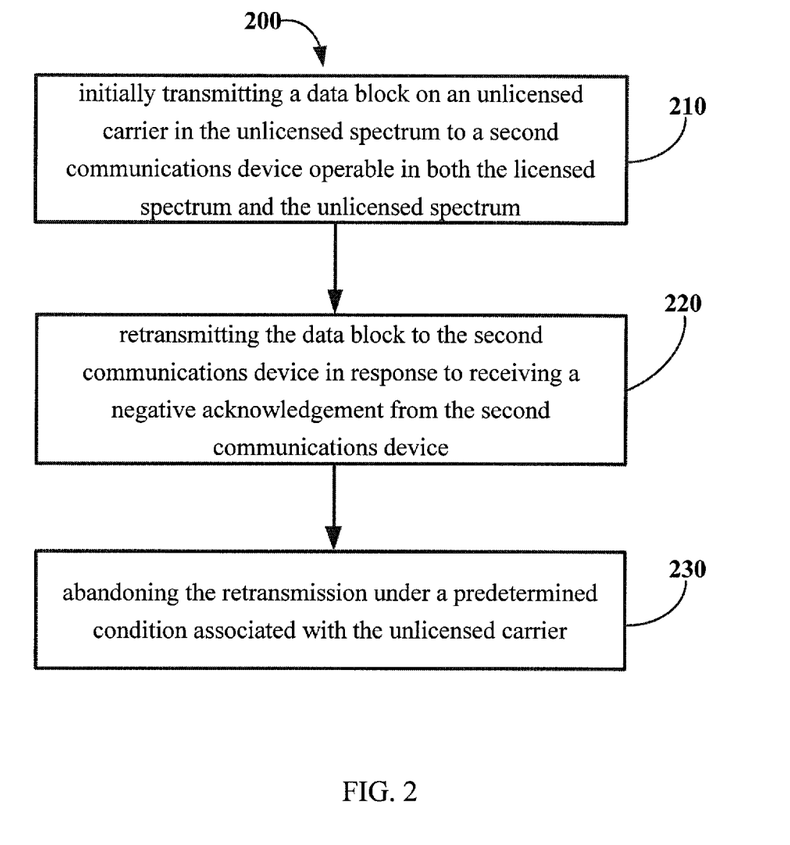
FIG. 2 illustrates a flowchart of an example method for data transmission at a communications device operable in both a licensed spectrum and an unlicensed spectrum according to an embodiment of the present disclosure.

FIG. 2 illustrates a flowchart of an example method 200 for data transmission at a communications device (which may be referred to as a first communications device hereafter) operable in both a licensed spectrum and an unlicensed spectrum according to an embodiment of the present disclosure. The "licensed spectrum" may cover several available licensed bands, in which one or more licensed carriers may be aggregated and adopted by the communications device to transmit data blocks or data units thereon. Likewise, the "unlicensed spectrum" may cover several available unlicensed bands, in which one or more unlicensed carriers may be aggregated and adopted by the communications device to transmit data blocks or data units thereon.

As illustrated in block 210 of FIG. 2, the first communications device initially transmits a data block on an unlicensed carrier of the unlicensed spectrum to another communications device (which will be referred to as a second communications device) that is also operable in both the licensed spectrum and the unlicensed spectrum.

Then, in block 220, in response to receiving a negative acknowledgement from the second communications device, the data block is retransmitted from the first communications device to the second communications device. Such a retransmission may be conducted according to a HARQ protocol in some embodiments. This retransmission will continue as long as the negative acknowledgement keeps being received, until a predetermined condition associated with the unlicensed carrier is satisfied and then this retransmission is abandoned in block 230. Preferably, the retransmission may be abandoned earlier than a maximum number of retransmissions on a licensed carrier configured for the first communications device in the licenced spectrum. The maximum number of retransmissions on the licensed carrier may be configured according to a MAC configuration information element (IE), MAC-MainConfig, as defined in 3GPP TS 36.331 version 11.8.0.

In an embodiment, the predetermined condition associated with the unlicensed carrier may comprise any of the following: a number of retransmissions reaching a predetermined maximum number of retransmissions on the unlicensed carrier; expiry of a predetermined timer; or reception of a message from the second communications device instructing the abandon of the retransmission.

In an example embodiment, the first communications device may configure its MAC layer in advance according to a MAC configuration IE, MAC-MainConfig, received from a base station, which may be the second communications device in some embodiments. In this IE MAC-MainConfig, additional information indicating the maximum number of retransmissions on the unlicensed carrier that is configured as a secondary carrier is added into the configuration element for the secondary carrier, MAC-MainConfigSCell-r11, as follows:

```
MAC-MainConfigSCell-r11 ::=    SEQUENCE {
    stag-Id-r11                STAG-Id-r11      OPTIONAL,    -- Need OP
    ul-SCH-Config              SEQUENCE {
        maxHARQ-Tx                 ENUMERATED {
                                       n1, n2, n3, n4, n5, n6, n7, n8,
                                       n10, n12, n16, n20, n24, n28,
                                       spare2, spare1}      OPTIONAL,    -- Need ON
    ...
}
```

During the MAC configuration, the maximum number of retransmissions on the unlicensed carrier may be set. As illustrated above, the enumerated numbers {n1, n2, n3 . . . n28} illustrates a list of possible maximum retransmission numbers that may be set for the unlicensed carrier. For example, if the MAC-MainConfig IE includes 'n5' in MAC-MainConifigSCell-r11, then the maximum number of retransmissions on the unlicensed carrier, i.e. the maximum HARQ number, may be set as 4 at the first communications device. In general, a same maximum number of retransmissions is set for all licensed carriers configured for a communications device. In this embodiment, the maximum number of retransmissions set for the unlicensed carrier may be preferably less than the maximum number of retransmissions set for the licensed carrier configured for the first communications device.

Figure 3:
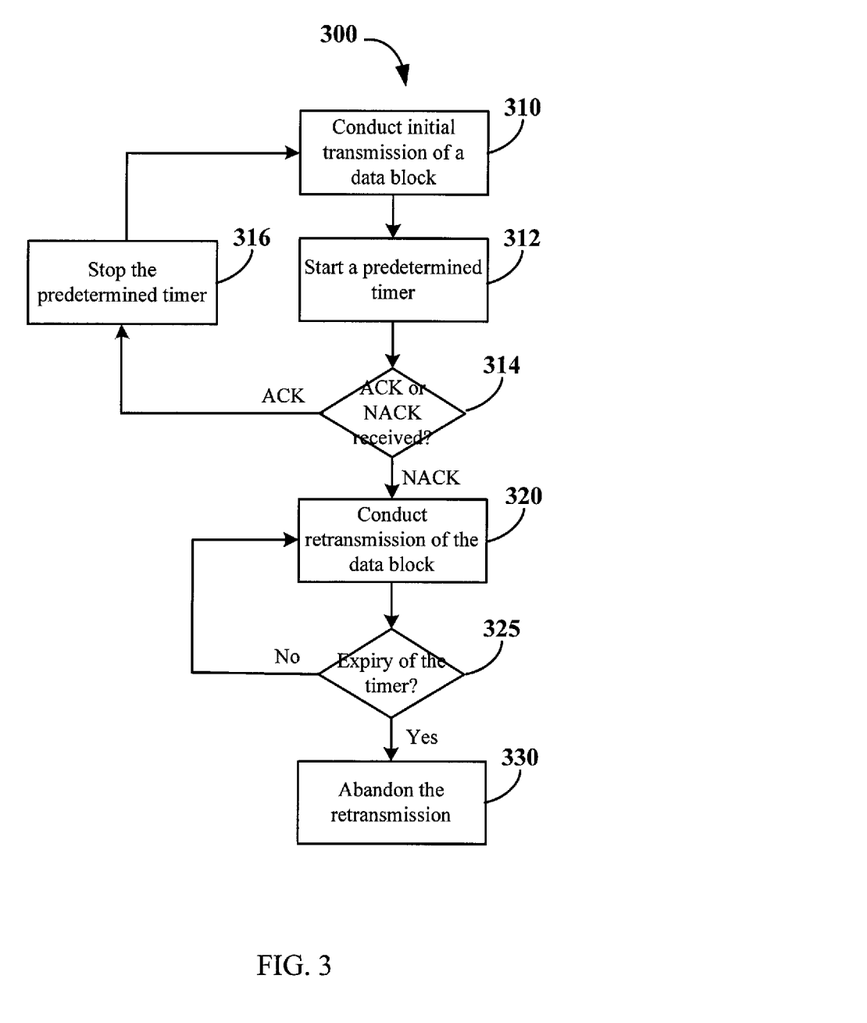
FIG. 3 illustrates a flowchart of an example method for data transmission according to an embodiment of the present disclosure in which a predetermined timer is set for an unlicensed carrier at the communications device of FIG. 2.

In another example embodiment, a predetermined timer may be set for the unlicensed carrier at the first communications device. FIG. 3 illustrates a flowchart of an example method 300 for data transmission according to this embodiment. In addition to the operations in blocks 210-230 as illustrated in FIG. 2, which correspond to operations in blocks 310, 320 and 330 of FIG. 3, the method 300 may further comprise starting the predetermined timer upon the initial transmission of the data block in block 312. If the initial transmission of the data block is acknowledged in block 314, the predetermined timer will be stopped in block 316 and then a new transmission for the next data block may be conducted in block 310; otherwise, for each of the following transmissions, i.e. retransmissions, in block 320, whether the predetermined timer expires needs to be checked in block 325. If it is checked that the predetermined timer expires, then the retransmission will be abandoned in block 330 and thus a buffer for buffering the data block may be flushed; otherwise, the retransmission continues in block 320 until the retransmission is acknowledged.

As an example, the predetermined timer may be set by directly reusing the value of the t-Reordering timer as defined in an IE RLC-config, which is used for specifying RLC configurations. Since the RLC-config is logical channel specific, and multiple logical channels may be contained in a specific MAC PDU, the rule for setting the predetermined timer may be varied. For example, the maximum or minimum value of t-Reordering timers for multiple logical channels in a MAC PDU may be used for setting the predetermined timer.

Alternatively, an independent timer may be set specifically for the MAC configuration, which requires a new timer definition/configuration by a base station via RRC signalling. In the case that the first communications device is a terminal device and the second communications device is a base station, the predetermined timer may be configured by the second communications device via RRC signalling.

In yet another example embodiment, whether to continue or abandon the retransmission may be controlled by the receiving side, i.e. the second communications device. The second communications device may send a message to the first communications device indicating abandon of the retransmission on another carrier, e.g. a licensed carrier or another unlicensed carrier. Upon reception of this message from the second communications device, the retransmission may be abandoned and accordingly the buffer for buffering the data block may be flushed; otherwise the retransmission of the data block will continue until an acknowledgement feedback is received.

As an example, the message may be typically a RLC status report in the IE RLC-config sent by the second communications device. Since the RLC-config is logical channel specific, and multiple logical channels may be contained in a specific MAC PDU, the rule for defining the abandon may be various. For example, the retransmission may be abandoned if all or just one of the logical channel triggers the status report.

In an embodiment that the first communications device is a base station and the second communications device is a terminal device, the predetermined condition may be known and controlled by the base station itself according to various implementations.

Figure 4:
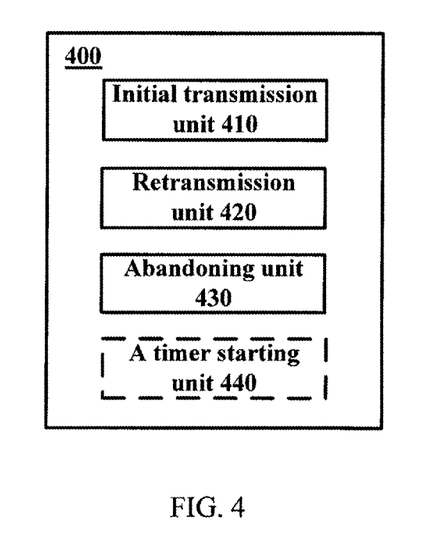
FIG. 4 illustrates a schematic block diagram of an apparatus adapted for data transmission at a communications device operable in both a licensed spectrum and an unlicensed spectrum according to an embodiment of the present disclosure.

FIG. 4 illustrates a schematic block diagram of an apparatus 400 adapted for data transmission at a communications device operable in both a licensed spectrum and an unlicensed spectrum according to an embodiment of the present disclosure. The apparatus 400 may be embodied at or as at least part of either a base station or a terminal device.

Particularly, as illustrated in FIG. 4, the apparatus 400 comprises an initial transmission unit 410, a retransmission unit 420 and an abandoning unit 430. The initial transmission unit 410 is configured to initially transmit a data block on an unlicensed carrier of the unlicensed spectrum to a second communications device operable in both the licensed spectrum and the unlicensed spectrum.

The retransmission unit 420 is configured to retransmit the data block to the second communications device in response to receiving a negative acknowledgement from the second communications device. In some embodiments, the retransmission unit 420 may be configured to conduct the retransmission according to a HARQ protocol.

The abandoning unit 430 is configured to abandon the retransmission under a predetermined condition associated with the unlicensed carrier. In an embodiment, the abandoning unit 430 may be further configured to abandon the retransmission earlier than a maximum number of retransmissions on a licensed carrier configured for the first communications device in the licensed spectrum.

In a further embodiment, the predetermined condition may comprise any of the following: a number of retransmissions reaching a predetermined maximum number of retransmissions on the unlicensed carrier; expiry of a predetermined timer; or reception of a message instructing the abandon of the retransmission from the second communications device. As discussed above, the predetermined maximum number of retransmissions on the unlicensed carrier and/or the predetermined timer may be configured by a base station.

In another embodiment that the predetermined condition comprises the expiry of the predetermined timer, the apparatus 400 may further comprise a timer starting unit 440 configured to start the predetermined timer when the data block is initially transmitted to the second communications device. In this embodiment, the operations of units 410-440 may be performed according to method 300 as illustrated in FIG. 3, which will not be detailed herein for the sake of brevity.

The above units 410-440 may be configured to implement the corresponding operations or steps as described with reference to FIG. 2 and thus will not be detailed herein for brevity purposes.

Figure 5:
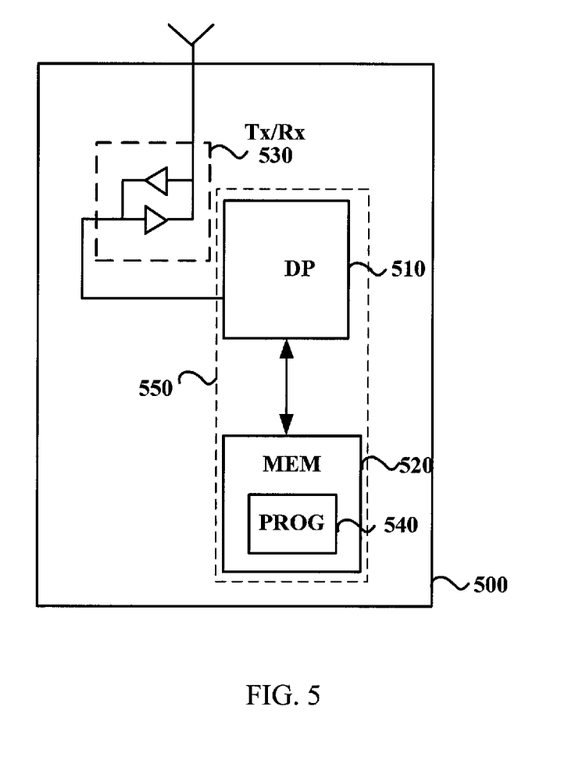
FIG. 5 illustrates a schematic block diagram of an apparatus for data transmission that may be embodied at a base station or a terminal device operable in both a licensed spectrum and an unlicensed spectrum according to embodiments of the present disclosure.

FIG. 5 illustrates a schematic block diagram of an apparatus 500 adapted for data transmission. The apparatus 500 may be embodied at or as at least part of a base station or a terminal device operable in both a licensed spectrum and an unlicensed spectrum according to embodiments of the present disclosure.

The apparatus 500 comprises at least one processor 510, such as a data processor (DP) and at least one memory (MEM) 520 coupled to the processor 510. The apparatus 500 may further comprise a transmitter TX and receiver RX 530 coupled to the processor 510 for establishing wireless communications with other communications devices. The MEM 520 stores a program (PROG) 540. The PROG 540 may include instructions that, when executed on the associated processor 510, enable the apparatus 500 to operate in accordance with the embodiments of the present disclosure, for example to perform the method 200 or 300. A combination of the at least one processor 510 and the at least one MEM 520 may form processing means 550 adapted to implement some embodiments of the present disclosure.

The MEM 520 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 510 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for data transmission at a first communications device, configured to communicate in both a licensed spectrum and an unlicensed spectrum, to transmit data to a second communications device, configured to communicate with the first communications device also in both the licensed spectrum and the unlicensed spectrum, the method comprising:

initially transmitting a data block on an unlicensed carrier of the unlicensed spectrum to the second communications device, wherein acknowledgement/negative acknowledgement signaling is used for acknowledging data reception by the second communications device;

starting a predetermined timer when the data block is initially transmitted to the second communications device;

retransmitting the data block to the second communications device on the unlicensed carrier in response to receiving a negative acknowledgement from the second communications device, provided that the predetermined timer has not expired; and
abandoning the retransmitting on the unlicensed carrier upon expiry of the predetermined timer.

2. The method according to claim 1, wherein the retransmitting is abandoned earlier than a maximum number of retransmissions on a licensed carrier configured for the first communications device in the licensed spectrum.

3. The method according to claim 1, wherein
the first communications device is a terminal device; and
the second communications device is a base station.

4. The method according to claim 3, wherein the predetermined timer is configured by the second communications device.

5. The method according to claim 1, wherein the retransmitting complies with a hybrid automatic repeat request (HARQ) protocol.

6. An apparatus for data transmission at a first communications device, configured to communicate in both a licensed spectrum and an unlicensed spectrum, to transmit data to a second communications device, configured to communicate with the first communications device also in both the licensed spectrum and the unlicensed spectrum, the apparatus comprising:
an initial transmission unit configured to initially transmit a data block on an unlicensed carrier of the unlicensed spectrum to a second communications device, wherein acknowledgement/negative acknowledgement signaling is used for acknowledging data reception by the second communications device;
a timer starting unit configured to start a predetermined timer when the data block is initially transmitted to the second communications device;
a retransmission unit configured to retransmit the data block to the second communications device on the unlicensed carrier in response to receiving a negative acknowledgement from the second communications device, provided that the predetermined timer has not expired; and
an abandoning unit configured to abandon the retransmit on the unlicensed carrier upon expiry of the predetermined timer.

7. The apparatus according to claim 6, wherein the abandoning unit is further configured to abandon the retransmit earlier than a maximum number of retransmissions on a licensed carrier configured for the first communications device in the licensed spectrum.

8. The apparatus according to claim 6, wherein
the first communications device is a terminal device; and
the second communications device is a base station.

9. The apparatus according to claim 8, wherein the predetermined timer is configured by the second communications device.

10. The apparatus according to claim 6, wherein the retransmit complies with a hybrid automatic repeat request (HARQ) protocol.

11. An apparatus for data transmission at a first communications device, configured to communicate in both a licensed spectrum and an unlicensed spectrum, to transmit data to a second communications device, configured to communicate with the first communications device also in both the licensed spectrum and the unlicensed spectrum, the apparatus comprising;
a processor and a non-transitory memory, said non-transitory memory containing instructions, which when executed by the processor, cause the apparatus to:
initially transmit a data block on an unlicensed carrier of the unlicensed spectrum to a second communications device, wherein acknowledgement/negative acknowledgement signaling is used for acknowledging data reception by the second communications device;
start a predetermined timer when the data block is initially transmitted to the second communications device;
retransmit the data block to the second communications device on the unlicensed carrier in response to receiving a negative acknowledgement from the second communications device, provided that the predetermined timer has not expired; and
abandon the retransmit on the unlicensed carrier upon expiry of the predetermined timer.

12. A non-transitory computer readable storage medium containing instructions which, when executed on at least one processor of a first communications device utilized for data transmission, and where the first communications device is configured to communicate in both a licensed spectrum and an unlicensed spectrum with a second communications device which is configured to communicate also in both the licensed spectrum and the unlicensed spectrum, cause the first communications device to perform operations comprising:
initially transmitting a data block on an unlicensed carrier of the unlicensed spectrum to a second communications device, wherein acknowledgement/negative acknowledgement signaling is used for acknowledging data reception by the second communications device;
starting a predetermined timer when the data block is initially transmitted to the second communications device;
retransmitting the data block to the second communications device on the unlicensed carrier in response to receiving a negative acknowledgement from the second communications device, provided that the predetermined timer has not expired; and
abandoning the retransmit on the unlicensed carrier upon expiry of the predetermined timer.

13. The apparatus according to claim 11, wherein the instructions, when executed by the processor, cause the apparatus to abandon the retransmitting earlier than a maximum number of retransmissions on a licensed carrier configured for the first communications device in the licensed spectrum.

14. The non-transitory computer readable storage medium according to claim 12, wherein the instructions, when retransmitting, cause the abandoning of the retransmitting earlier than a maximum number of retransmissions on a licensed carrier configured for the communications device in the licensed spectrum.

15. The non-transitory computer readable storage medium according to claim 12, wherein the first communications device is a terminal device and the second communications device is a base station.

16. The non-transitory computer readable storage medium according to claim 15, wherein the predetermined timer is configured by the second communications device.

17. The non-transitory computer readable storage medium according to claim 12, wherein the instructions, when retransmitting, cause the retransmitting to comply with a hybrid automatic repeat request (HARQ) protocol.

* * * * *